(12) United States Patent
Prissok et al.

(10) Patent No.: US 8,790,769 B2
(45) Date of Patent: Jul. 29, 2014

(54) TRANSPARENT, LASER-INSCRIBABLE POLYURETHANE

(75) Inventors: Frank Prissok, Lemfoerde (DE); Nicole Duevel, Lembruch (DE); Aleksander Glinka, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 657 days.

(21) Appl. No.: 12/981,837

(22) Filed: Dec. 30, 2010

(65) Prior Publication Data

US 2011/0165381 A1 Jul. 7, 2011

Related U.S. Application Data

(60) Provisional application No. 61/292,180, filed on Jan. 5, 2010.

(51) Int. Cl.
| | | |
|---|---|---|
| *B32B 3/00* | (2006.01) | |
| *B32B 5/16* | (2006.01) | |
| *B32B 19/00* | (2006.01) | |
| *B32B 9/00* | (2006.01) | |

(52) U.S. Cl.
USPC ............ 428/156; 428/323; 428/688; 428/702

(58) Field of Classification Search
USPC ......... 428/156, 323, 328, 330, 339, 688, 689, 428/702
See application file for complete search history.

(56) References Cited

U.S. PATENT DOCUMENTS

| | | | |
|---|---|---|---|
| 6,503,316 B1 | 1/2003 | Sakoske et al. | |
| 2003/0108723 A1 | 6/2003 | Sakoske et al. | |
| 2007/0029294 A1 | 2/2007 | Peng | |

FOREIGN PATENT DOCUMENTS

| | | |
|---|---|---|
| EP | 0 684 144 A1 | 11/1995 |
| EP | 1 190 988 A2 | 3/2002 |
| WO | WO 95/30546 A1 | 11/1995 |
| WO | WO 01/00719 A1 | 1/2001 |
| WO | WO 2006/065611 A1 | 6/2006 |

*Primary Examiner* — Catherine A Simone
(74) *Attorney, Agent, or Firm* — Oblon, Spivak, McClelland, Maier & Neustadt, L.L.P.

(57) ABSTRACT

The present invention relates to a transparent, laser-inscribable, preferably thermoplastic polyurethane, and to the production and use thereof.

15 Claims, No Drawings

TRANSPARENT, LASER-INSCRIBABLE POLYURETHANE

FIELD OF THE INVENTION

The present invention relates to a transparent, laser-inscribable, preferably thermoplastic polyurethane, and to the production and use thereof.

BACKGROUND OF THE INVENTION

Identification marking of products is of increasing importance in almost every branch of industry. By way of example, production data, expiry dates, barcodes, company logos, serial numbers, etc. often have to be applied to said products. These markings are often currently still produced by conventional techniques, such as printing, embossing, stamping, and labeling. However, increasing importance is being placed on contactless, very rapid and flexible marking by lasers, in particular for plastics products and plastics packaging. This technique permits high-speed application of identification marks, e.g. graphic inscriptions, such as barcodes, even when the surface is not flat. The location of the inscription is within the actual plastic and it is therefore durable, abrasion-resistant, and counterfeit-resistant.

Alongside $CO_2$ lasers, Nd-YAG lasers and excimer lasers are increasingly used for laser identification marking of plastics. However, laser marking of many plastics is difficult or impossible unless they are subjected to additional modification, examples being polyolefins and polystyrenes. By way of example, a $CO_2$ laser emitting light in the infrared region at 10.6 μm produces only a weak, barely legible marking on polyolefins and polystyrenes, even if very high power levels are used. Again, Nd-YAG lasers do not interact with polyurethanes and polyetheresters. In order to achieve a good marking, complete reflection or complete transmission of the laser light by the plastic is not permissible, because no interaction then occurs. In contrast, if energy absorption is excessive, the plastic can vaporize in the irradiated region, the result then being an engraving process rather than a visible graphic identification marking.

It is known that plastics can be rendered laser-inscribable by adding appropriate absorbers, e.g. absorbent pigment particles. The incident laser light is then converted to heat, producing a marked rise in the temperature of the pigment particles within fractions of a second. If the amount of heat generated by absorbed laser light within a very localized region of the plastic is greater than can be simultaneously dissipated into the environment, the result is severe local heating and either carbonization of the plastic or a chemical reaction of the plastic and/or of the absorber, or formation of a gas, e.g. $CO_2$. These processes lead to alteration of color, transparency, and/or refractive index for incident light, and thus to marking of the plastic.

It is known that organic dyes and pigments can be used for modification of plastics in order to render these laser-markable.

EP-A-684144 A1 describes a composition for the coloring of plastic parts via laser irradiation, comprising a mixture of at least one opacifier and at least one chromogenic compound. The opacifiers here were selected from mica, nanoscale $TiO_2$, and metal oxides based on antimony oxide.

WO 01/00719 A1 describes a polymer composition which comprises a polymer and an additive that permits laser marking. Antimony trioxide is used here at a concentration of at least 0.1% by weight, with particle size>0.5 μm.

WO 95/30546 A1 describes laser-markable plastics, in particular thermoplastic polyurethanes, which comprise pigments, where these were coated with doped tin dioxide.

WO 2006/065611 A1 describes a material made of a thermoplastic polyurethane, of an opacifying bismuth oxide, and, if appropriate, of a colorant, and the use of said material for laser marking.

The abovementioned processes have at least one of the following disadvantages:

The pigments used comprise those with particle sizes in the μm range (≥1000 nm), which therefore exhibit considerable scattering in the visible region of the spectrum, or those which color the plastics matrix, or have an intrinsic color, or are used at concentrations that produce opaque coloration. This makes it impossible to inscribe transparent plastics.

The absorption of the dopant is non-maximal at the laser wavelength used for the identification marking process. A relatively high amount of the dopant is therefore required, often above 0.1%.

The use of antimony-containing dopants is undesirable, because of the undesirable contamination of the doped plastics with heavy metal.

Some of the pigments used hitherto as dopant are electrically conductive, an example being antimony-doped tin oxide. Use of these increases the conductivity of the plastic and thus lowers its tracking resistance, and this is disadvantageous for particular applications.

SUMMARY OF THE INVENTION

The invention was based on the object of providing improved materials preferably based on thermoplastic polyurethanes (TPU).

The invention provides a transparent, preferably thermoplastic polyurethane (TPU) which comprises a bismuth oxide as contrast agent and which is inscribable by means of high-energy radiation, wherein the average grain size of the bismuth oxide is <1.5 μm.

A transparent polyurethane in particular means a polyurethane, preferably thermoplastic polyurethane, for which the light transmittance value measured on an injection-molded plaque of thickness 2 mm, at a wavelength of from 400 nm to 800 nm, is>80%, preferably>85%, more preferably>90%, and particularly preferably>95%.

The grain size is preferably determined by means of transmission electron microscopy via measurements made on a section of a test specimen of polyurethane. The thickness of the section here is preferably 2 mm. The average grain size is preferably the number average. In one preferred embodiment, the average grain size of the bismuth oxide is <0.5 μm.

The bismuth oxide is preferably a compound of the formula $Bi_2O_3$. The amount comprised in the polyurethane thereof is preferably less than 4% by weight, based on the polyurethane, in particular less than 0.5% by weight, and very particularly preferably an amount of less than 0.1% by weight.

The invention further provides a process for the production of transparent inscribed preferably thermoplastic polyurethanes, which comprises using high-energy radiation to irradiate the preferably thermoplastic polyurethane according to the invention to produce an image.

Irradiation to produce an image means here that the irradiation is undertaken specifically only at selected sites, thus preferably permitting production of numerals, letters, or other markings.

The invention further provides a preferably thermoplastic polyurethane inscribed to produce an image and obtainable by subjecting the as yet uninscribed preferably thermoplastic polyurethane of the invention to inscription to produce an image. The invention provides in particular an inscribed, preferably thermoplastic polyurethane which is transparent at sites that have not been inscribed, and its DIN 66236 contrast value between inscribed and uninscribed sites is at least 68, preferably at least 70.

The bismuth oxide preferably used is freely available commercially, for example in the form of bismuth(III) oxide from Sigma-Aldrich. In one preferred embodiment it has the following properties:
Purity: 99.9%
Grain size:<10 μm
If the grain size of the bismuth oxides is unsuitable, they can be converted to the preferred grain size, from 1500 nm to smaller than 500 nm, by grinding and sieving. There are a number of ways of incorporating the bismuth oxide into the preferably thermoplastic polyurethane. Preferred types of incorporation process are:
1. Addition of the bismuth oxide to a starting component before production of the preferably thermoplastic polyurethane is complete, preferably to the
   polyisocyanate or
   polyol or
   chain extender.
2. Incorporation of the bismuth oxide into the finished preferably thermoplastic polyurethane TPU-1 during the process of extrusion or of injection molding, by means of a concentrate made of bismuth oxide in a preferably thermoplastic polyurethane, comprising from 1 to 50% by weight, preferably from 1 to 10% by weight, of bismuth oxide. In one preferred embodiment, the polyurethane (TPU-2) used in the concentrate is the same or in essence the same as TPU-1, but it is also possible to select the softness level of TPU-2 to be somewhat higher.

The polyurethanes to be used in the invention are preferably thermoplastic polyurethanes (TPU). These are well known, and their production has been widely described. It usually uses reaction of di- or polyfunctional isocyanates or of appropriate isocyanate analogs with compounds reactive toward isocyanates. Conventional production processes are used, preferably the one-shot process or the prepolymer process, e.g. in molds, in a reactive extruder, or else on a belt system. The reactive injection molding (RIM) process is a specific production process which is preferably used for the production of polyurethanes with a foamed or compact core and with a predominantly compact, nonporous surface. The compound (I) and its derivatives are advantageously suitable for all of these processes.

Polyurethanes are generally composed of at least one polyisocyanate and of at least one compound having at least two groups per molecule that are reactive toward isocyanate groups. Suitable polyisocyanates preferably have from 2 to 5 NCO groups. The groups reactive toward isocyanate groups are preferably groups selected from hydroxy, mercapto, and primary and secondary amino groups. These compounds preferably include di- or polyhydric polyols.

Suitable polyisocyanates are aliphatic, cycloaliphatic, araliphatic, and aromatic isocyanates. Particularly suitable aromatic diisocyanates are diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate. Aliphatic and cycloaliphatic diisocyanates in particular comprise tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate, and/or dicyclohexylmethane 4,4'-, 2,4'-, and/or 2,2'-diisocyanate. Preferred examples of isocyanates of higher functionality are triisocyanates, e.g. triphenylmethane 4,4',4"-triisocyanate, and also the cyanurates of the abovementioned diisocyanates, and also the oligomers obtainable via partial reaction of diisocyanates with water, e.g. the biurets of the above-mentioned diisocyanates, and also oligomers obtainable via controlled reaction of semicapped diisocyanates with polyols, where these have an average of more than 2 and preferably 3 or more hydroxy groups.

The polyol components used here for rigid polyurethane foams which can, if appropriate, have isocyanurate structures, comprise high-functionality polyols, in particular polyether polyols based on polyhydric alcohols, sugar alcohols, and/or saccharides, as starter molecules. For flexible polyisocyanate polyaddition products, e.g. flexible polyurethane foams or RIM materials, preference is given to di- and/or trifunctional polyether polyols based on glycerol and/or on trimethylolpropane and/or on glycols as starter molecules in the form of polyols, and to di- and/or trifunctional polyether polyols based on glycerol and/or on trimethylolpropane, and/or on glycols, as alcohols to be esterified, in the form of polyols. Thermoplastic polyurethanes are usually based on predominantly difunctional polyester polyalcohols and/or polyether polyalcohols, where these preferably have average functionality of from 1.8 to 2.5, particularly from 1.9 to 2.1.

The polyurethane can be not only the polyester polyurethane but also preferably a polyether polyurethane, particular preference being given to a polytetrahydrofuran polyether polyurethane.

The polyether polyols are produced here by using known technology. Particularly suitable alkylene oxides for the production of the polyols are propylene 1,3-oxide, butylene 1,2- or 2,3-oxide, and in particular ethylene oxide and propylene 1,2-oxide. The alkylene oxides can be used individually, in alternating succession, or in the form of a mixture. It is preferable to use alkylene oxides which lead to primary hydroxy groups in the polyol. The polyols used particularly preferably comprise those which have been alkoxylated with ethylene oxide at the conclusion of the alkoxylation process, thus having primary hydroxy groups. Other suitable polyetherols are polytetrahydrofurans and polyoxymethylenes. The functionality of the polyether polyols is preferably from 2 to 6 and in particular from 2 to 3, and their number-average molar mass (Mn) is from 200 g/mol to 10000 g/mol, preferably from 200 g/mol to 8000 g/mol. Suitable polytetrahydrofurans are compounds of the general formula

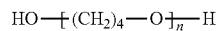

where n=from 2 to 200, preferably from 3 to 150, and mixtures thereof. The number-average molar mass Mn of these polytetrahydrofurans is preferably in the range from 200 g/mol to 100 000 g/mol, with preference from 250 g/mol to 8000 g/mol. Suitable polytetrahydrofurans can be produced via cationic polymerization of tetrahydrofuran in the presence of acidic catalysts, e.g. sulfuric acid or fluorosulfuric acid. Production processes of this type are known to the person skilled in the art.

Suitable polyester polyols can in particular be produced from organic dicarboxylic acids having from 2 to 12 carbon atoms, preferably from aliphatic dicarboxylic acids having from 4 to 6 carbon atoms, and from polyhydric alcohols, preferably diols, having from 2 to 12 carbon atoms, preferably from 2 to 6 carbon atoms. It is preferable that the functionality of the polyester polyols is from 2 to 4, in particular from 2 to 3, their number-average molar mass (Mn) being from 480 g/mol to 3000 g/mol, preferably from 600 g/mol to 2000 g/mol, and in particular from 600 g/mol to 1500 g/mol.

The polyol component can moreover also comprise diols or alcohols of higher functionality. Suitable diols are glycols preferably having from 2 to 25 carbon atoms. Among these are 1,2-ethanediol, 1,2-propanediol, 1,3-propanediol, 1,4-butanediol, 1,5-pentanediol, 1,6-hexanediol, 1,10-decanediol, diethylene glycol, 2,2,4-trimethyl-1,5-pentanediol, 2,2-dimethyl-1,3-propanediol, 1,4-dimethylolcyclohexane, 1,6-dimethylolcyclohexane, 2,2-bis(4-hydroxyphenyl)propane (bisphenol A), 2,2-bis(4-hydroxyphenyl)butane (bisphenol B), or 1,1-bis(4-hydroxyphenyl)-3,3,5-trimethylcyclohexane (bisphenol C). Examples of suitable alcohols of higher functionality are trihydric alcohols (triols), tetrahydric alcohols (tetrols), and/or pentahydric alcohols (pentols). They generally have from 3 to 25 carbon atoms, preferably from 3 to 18. Among these are glycerol, trimethylolethane, trimethylpropane, erythritol, pentaerythritol, sorbitol, and alkoxylates of these.

An advantageous method that proves successful for modifying mechanical properties, e.g. hardness, can be addition of chain extenders, crosslinking agents, terminators or, if appropriate, a mixture thereof. The number-average molar mass (Mn) of the chain extenders and/or crosslinking agents is preferably from 40 g/mol to 300 g/mol. Preferred compounds that can be used are aliphatic, cycloaliphatic, and/or araliphatic diols having from 2 to 14 carbon atoms, in particular from 2 to 10, examples being ethylene glycol, 1,3-propanediol, 1,2-propanediol, 1,10-decanediol, 1,2-, 1,3-, or 1,4-dihydroxycyclohexane, diethylene glycol, dipropylene glycol, and preferably ethylene glycol, 1,4-butanediol, 1,6-hexanediol, and bis(2-hydroxyethyl)hydroquinone, triols, such as 1,2,4- and 1,3,5-trihydroxycyclohexane, glycerol, trimethylolpropane, and triethanolamine, and low-molecular-weight hydroxylated polyalkylene oxides based on ethylene oxide and/or on propylene 1,2-oxide and on the abovementioned diols and/or triols as starter molecules. Suitable terminators preferably comprise monohydric alcohols or secondary amines.

In one particularly preferred embodiment, the polyurethane of the invention is composed of hard phases and soft phases, where
a) the soft phases have symmetrical structure and are based on polyols with number-average molar mass Mn<2000 g/mol, or are not symmetrical, and
b) the diameter of the hard phases is <700 nanometers.

In one preferred embodiment here, the structure of the soft phases a) is based on polyether polyols.

The expression preferably thermoplastic polyurethanes here also includes polyureas, where these are obtainable, as is known, via a polyaddition reaction of diamines and diisocyanates.

The preferably thermoplastic polyurethanes of the invention can comprise at least one additive preferably selected from colorants, antioxidants, light stabilizers, metal deactivators, antistatic agents, reinforcing materials and fillers, antifogging agents, and biocides.

For the purposes of the invention, the term colorant comprises dyes that are in essence organic, examples being organic compounds, such as fluorescent dyes, which exhibit fluorescence in the visible portion of the electromagnetic spectrum. In principle, suitable compounds are any of the colorants that permit laser marking of plastics in which they are present as additives.

The UV stabilizers used can comprise commercially available compounds. The stabilizer component can be added in solid or liquid form prior to, during, and after the production of the polymer. The stabilizer component can be incorporated prior to, during, or after the production of the polymer.

The polymer composition of the invention usually comprises an amount of from 0.01 to 5% by weight, preferably from 0.02 to 2.5% by weight, and with particular preference from 0.01 to 1.0% by weight, based on the total weight of the composition, of at least one UV stabilizer.

The composition of the invention can also comprise at least one additive selected from antioxidants, metal deactivators, antistatic agents, reinforcing materials and fillers, antifogging agents, and biocides.

The preferably thermoplastic polyurethanes of the invention are particularly suitable for identification marking by means of high-energy radiation, in particular by means of lasers. The preferred method of laser inscription is that the specimen is placed in the path of laser radiation, preferably from a pulsed laser. It is preferable to use an Nd-YAG laser. Another possibility is inscription by an excimer laser, e.g. by way of a mask technique. However, the desired results can also be achieved with other conventional types of laser which have a wavelength in a range of high absorption of the absorber used, examples being $CO_2$ lasers. The marking obtained is determined by the irradiation time (or number of pulses in the case of pulsed lasers) and irradiation power level of the laser, and also by the plastics system used. The power level of the lasers used depends on the respective application and can readily be determined by the person skilled in the art in any individual case.

The TPU materials of the invention can be used in any of the sectors where conventional printing methods have hitherto been used for the inscription of plastics. Moldings made of the TPU of the invention can preferably be used in the electrical industry, electronics industry, and motor vehicle industry. Examples of products on which identification marking and inscription can be achieved with the aid of laser light, even at sites that are difficult to access, are cables and lines, and the decorative strips or functional parts that are used in the heating, ventilation, and cooling sector, or switches, plugs, levers, and handles, where these are composed of the TPU of the invention. The TPU of the invention can also be used for packaging in the food-and-drinks sector or in the toy sector, because it has low heavy metal content. A feature of the markings on the packaging is that they are resistant to wiping and scratching, are stable during subsequent sterilization processes, and can be applied by a marking process that provides high hygiene levels. Complete label images can be applied durably to multiuse packaging. Another important application sector for laser inscription is provided by plastics tags, known as cattle tags or ear tags, for the individual identification marking of animals. A barcode system is used to store information specific to the animal. This can then be read with the aid of a scanner when required. The inscription has to be very durable because some of the tags remain on the animals for a number of years,

EXAMPLES

Starting Substances

Starting substances used are shown in table 1 below:

TABLE 1

| Name | Chemical constitution | Source |
|---|---|---|
| BiO | Bismuth oxide, $Bi_2O_3$ | Sigma-Aldrich |
| Iso | Methylenediphenylene 4,4'-diisocyanate | BASF |
| Polyol | Polytetrahydrofuran, $Mn^{1)}$: 1000, OH number: 111.1 | BASF |
| CE | 1,4-Butanediol, chain extender | BASF |
| AO | Antioxidant | BASF |

[1] Mn is number-average molecular weight

Provision of Bismuth Oxide

The bismuth oxide was comminuted and homogenized in a ball mill prior to use and then had the following properties:
Yellowish white powder
Average grain size:<500 nm
Provision of a Thermoplastic Polyurethane
PU1

850 g of polyol and 107.8 g of CE were weighed into a 2 l tinplate bucket and heated to 80° C. 14 g of AO and 6.7 g of BiO were then added, with stirring at 220 rpm. After a stirring stage lasting 2 min for homogenization, 510 g of Iso were added to the solution and stirring was continued (45 s) until the temperature of the solution had reached 110° C. The reaction mass was then poured into a flat dish and held at 125° C. for 10 min on a hotplate. The resultant skin was then heat-conditioned at 100° C. for 24 h in an oven.
PU2

850 g of polyol and 107.8 g of CE were weighed into a 2 l tinplate bucket and heated to 80° C. 14 g of AO and 1.4 g of BiO were then added, with stirring at 220 rpm. After a stirring stage lasting 2 min for homogenization, 510 g of Iso were added to the solution and stirring was continued (45 s) until the temperature of the solution had reached 110° C. The reaction mass was then poured into a flat dish and held at 125° C. for 10 min on a hotplate. The resultant skin was then heat-conditioned at 100° C. for 24 h in an oven.

The resultant material was comminuted and processed in an injection-molding machine to give 2 mm injection-molded plaques.
Measurement of Contrast Value An Nd:YAG laser was used at a wavelength of 1064 nm as in table 2 to inscribe the resultant plaques. The laser used here had a typical CW power level of 50 W and a typical QS power level of 10 kW/pulse at 10 kHz. The TPU plaques then exhibited a dark inscription on a transparent background, the inscription here being "within" the test plaque, and there were no surface defects.

TABLE 2

Contrast values

| Specimen [Injection-molded plaque] | Laser current [A] | Pulse frequency [kHz] | Contrast [DIN 66236] |
|---|---|---|---|
| PU1 | 26 | 3 | 71.5 |
| PU2 | 30 | 4 | 70.5 |

Contrast Value

The palest and the darkest point on the inscription and on the substrate were used to calculate the contrast values. In the case of transparent specimens, a white background was used.

$$DIN\ 66236\ \text{contrast value} = \frac{\text{Substrate} - \text{Inscription}}{\text{Substrate}} \times 100$$

Materials are considered to have good laser inscribability if the contrast value is 70 or higher.

The invention claimed is:

1. A transparent polyurethane, comprising:
a bismuth oxide as a contrast agent, wherein:
the polyurethane comprises a hard phase and a soft phase, the soft phase has a non-symmetrical or a symmetrical structure and is based on polyols with number-average molar mass Mn<2000 g/mol, and the hard phase has a diameter of <700 nanometers;
the polyurethane is inscribable by high-energy radiation; and
the bismuth oxide has an average grain size of <1.5 μm.

2. The polyurethane of claim 1, wherein the polyurethane is a thermoplastic polyurethane (TPU).

3. The polyurethane of claim 1, wherein the average grain size of the bismuth oxide is <0.5 μm.

4. The polyurethane of claim 1, wherein the bismuth oxide has a formula of $Bi_2O_3$.

5. The polyurethane of claim 1, wherein an amount of the bismuth oxide is <4% by weight, based on the polyurethane.

6. The polyurethane of claim 5, wherein the amount of the bismuth oxide is <0.5% by weight.

7. The polyurethane according to of claim 1, wherein the soft phase has a structure based on polyether polyols.

8. A process for producing the polyurethane of claim 1, the process comprising:
adding the bismuth oxide in a concentrate form to the polyurethane.

9. A process for producing a transparent, inscribed polyurethane, the process comprising:
irradiating, with high-energy radiation, the polyurethane of claim 1.

10. The process of claim 9, wherein the high-energy radiation comprises laser radiation.

11. The process of claim 10, wherein the laser radiation is from an Nd:YAG laser.

12. A thermoplastic polyurethane obtained by the process of claim 9, wherein
the polyurethane is inscribed to produce an image,
the polyurethane is transparent at sites that have not been inscribed, and
a DIN 66236 contrast value between inscribed and uninscribed sites is at least 68.

13. A process for producing an identification mark, the process comprising:
introducing the thermoplastic polyurethane of claim 12 into an identification mark in need thereof.

14. The polyurethane of claim 5, wherein the amount of the bismuth oxide is <0.1% by weight.

15. The thermoplastic polyurethane of claim 12, wherein the DIN 66236 contrast value between inscribed and uninscribed sites is at least 70.

* * * * *